United States Patent
Shah et al.

(10) Patent No.: US 10,512,053 B2
(45) Date of Patent: Dec. 17, 2019

(54) SYSTEM AND METHOD FOR SELECTIVELY HIBERNATING AND RESTARTING A NODE OF AN APPLICATION INSTANCE

(71) Applicant: ServiceNow, Inc., Santa Clara, CA (US)

(72) Inventors: Siddharth Shah, Bellevue, WA (US); Herman Knief, Sammamish, WA (US); Vincent Seguin, Encinitas, CA (US); Jeremy Norris, Lakeside, CA (US)

(73) Assignee: ServiceNow, Inc., Santa Clara, CA (US)

(*) Notice: Subject to any disclaimer, the term of this patent is extended or adjusted under 35 U.S.C. 154(b) by 88 days.

(21) Appl. No.: 15/590,725

(22) Filed: May 9, 2017

(65) Prior Publication Data
US 2017/0329390 A1 Nov. 16, 2017

Related U.S. Application Data

(60) Provisional application No. 62/334,253, filed on May 10, 2016.

(51) Int. Cl.
*H04W 56/00* (2009.01)
*G06F 9/4401* (2018.01)

(52) U.S. Cl.
CPC ...... *H04W 56/0015* (2013.01); *G06F 9/4418* (2013.01); *H04W 56/001* (2013.01)

(58) Field of Classification Search
CPC .... G06F 12/08; G06F 9/4418; G06F 11/3006; G06F 11/301; G06F 11/3082
(Continued)

(56) References Cited

U.S. PATENT DOCUMENTS 7,162,629 B2 1/2007 Zimmer et al.
8,181,071 B2 * 5/2012 Cahill .................. H04L 12/403
                                                      709/225

(Continued)

FOREIGN PATENT DOCUMENTS

WO    2015048855 A1    4/2015

OTHER PUBLICATIONS

Espadas et al. "A tenant-based resource allocation model for scaling Software-as-a-Service applications over cloud computing infrastructures <http://www.sciencedirect.com/science/article/pii/S0167739X1100210X>" Future Generation Computer Systems. vol. 29, Issue 1, Jan. 2013, pp. 273-286.

*Primary Examiner* — Todd L Barker
(74) *Attorney, Agent, or Firm* — Fletcher Yoder PC

(57) ABSTRACT

A node of an application instance in a distributed computing environment can be selectively hibernated and the execution of the node selectively restarted by first detecting a condition of the node that satisfies a criterion for hibernating the node. The node may then be hibernated by suspending execution of the node on a server and initiating execution of a listener. The listener can use a network port that the node used before the execution of the node was suspended. At a later time, a request from a client to the application instance can be received by the listener. The request can be a request to restart execution of the node. Responsive to the request and a determination that the server has a predefined amount of resources for permitting execution of the node, the execution of the node on the server can be restarted.

19 Claims, 11 Drawing Sheets

(58) Field of Classification Search
CPC ............ G06F 11/3495; H04W 56/001; H04W 56/0015; H04L 12/403; H04L 41/0663; H04L 43/0817; H04L 67/1002; H04L 67/1031
See application file for complete search history.

(56) References Cited

U.S. PATENT DOCUMENTS

| | | | |
|---|---|---|---|
| 8,316,248 B2 | 11/2012 | Yokota et al. | |
| 2012/0227038 A1 | 9/2012 | Hunt et al. | |
| 2013/0080510 A1* | 3/2013 | Leftik ................. | G06F 9/45512 709/203 |
| 2013/0179569 A1* | 7/2013 | Alred .................. | H04L 12/2834 709/224 |
| 2013/0297668 A1* | 11/2013 | McGrath ................ | G06F 9/485 709/201 |
| 2014/0122723 A1* | 5/2014 | Glover ................. | G06F 9/5072 709/226 |
| 2016/0378450 A1* | 12/2016 | Fu ............................ | G06F 8/61 717/177 |

\* cited by examiner

SYSTEM AND METHOD FOR SELECTIVELY HIBERNATING AND RESTARTING A NODE OF AN APPLICATION INSTANCE

CROSS REFERENCE TO RELATED APPLICATION(S)

The present disclosure claims the benefit of U.S. Provisional Application No. 62/334,253, filed May 10, 2016, the disclosure of which is hereby incorporated by reference in its entirety.

TECHNICAL FIELD

The present disclosure is generally related to systems and techniques for selectively hibernating and restarting a node of an application instance.

BACKGROUND

A distributed computing environment may be configured to host an application instance that can provide platform and application level functionality to customers and users. The application instance may be implemented on one or more server devices and accessed through a network, such as a computer network, by a client device. The application instance may be accessed in various ways such as through a web interface that is provided by the application instance. More than one application instance can be provisioned within the distributed computing environment. The application instance may be accessed, executed, or stored on more than one server device within the distributed computing environment.

Application instances can be implemented in a single tenant or multi instance manner. For example, an application instance can include one or more application nodes and one or more database nodes which can be used by and configured or customized for a single customer or developer. The application node can include application software or configuration which can provide the web interface and include platform software and other functionality such as for handling input via the web and other interfaces and for providing output to the web interface. The database node can be utilized by the application node to store records of data associated with the application instance.

SUMMARY

Disclosed herein are aspects of systems and techniques for selectively hibernating and restarting a node of an application instance.

In an implementation, a system is provided for selectively hibernating and restarting execution of a node of an application instance in a distributed computing environment. The system comprises a memory and a processor. The memory includes instructions executable by the processor to determine that a criterion for hibernation of the node is satisfied. The memory further includes instructions executable by the processor to hibernate the node when the criterion is satisfied. The instructions to hibernate the node include instructions to suspend execution of the node on a server and initiate execution of a listener using a network port that the node used before the suspension. The memory further includes instructions executable by the processor to receive, by the listener, a request from a client for the application instance. The memory further includes instructions executable by the processor to, responsive to the request and a determination that the server has a predefined amount of resources to permit execution of the node, restart execution of the node.

In an implementation, a method is provided for selectively hibernating and restarting execution of a node of an application instance in a distributed computing environment. The method comprises determining that a criterion for hibernating the node is satisfied. The method further comprises hibernating the node when the criterion is satisfied by suspending execution of the node on a server and initiating execution of a listener using a network port that the node used before the suspending. The method further comprises receiving, by the listener, a request from a client for the application instance. The method further comprises, responsive to the request and determining that the server has a predefined amount of resources to permit execution of the node, restarting execution of the node.

In an implementation, a non-transitory computer-readable storage medium is provided. The non-transitory computer-readable storage medium comprises processor-executable routines that, when executed by a processor, facilitate a performance of operations. The operations comprise observing an operation of a node executed by a processor on a first server. The node is a node of an application instance in a distributed computing environment. The operations further comprise determining that a criterion for hibernation of the node is satisfied based on the observing. The operations further comprise hibernating the node by suspending execution of the node on the first server and initiating execution of a listener on the first server using a network port the used by the node to communicate with a computer network via a network interface of the first server before the suspending. The operations further comprise receiving, by the listener, a request from a client for the application instance using the network interface of the first server and a network interface of the client. The operations further comprise restarting execution of the node in response to the request, a determination that the first server has a predefined amount of available resources to permit execution of the node, and an authentication of the client using a control server connected to the first server using the network interface of the first server and a network interface of a control server. The control server includes a configuration management database including one or more records that associate an address and the network port with the node.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views.

DETAILED DESCRIPTION

Figure 1:
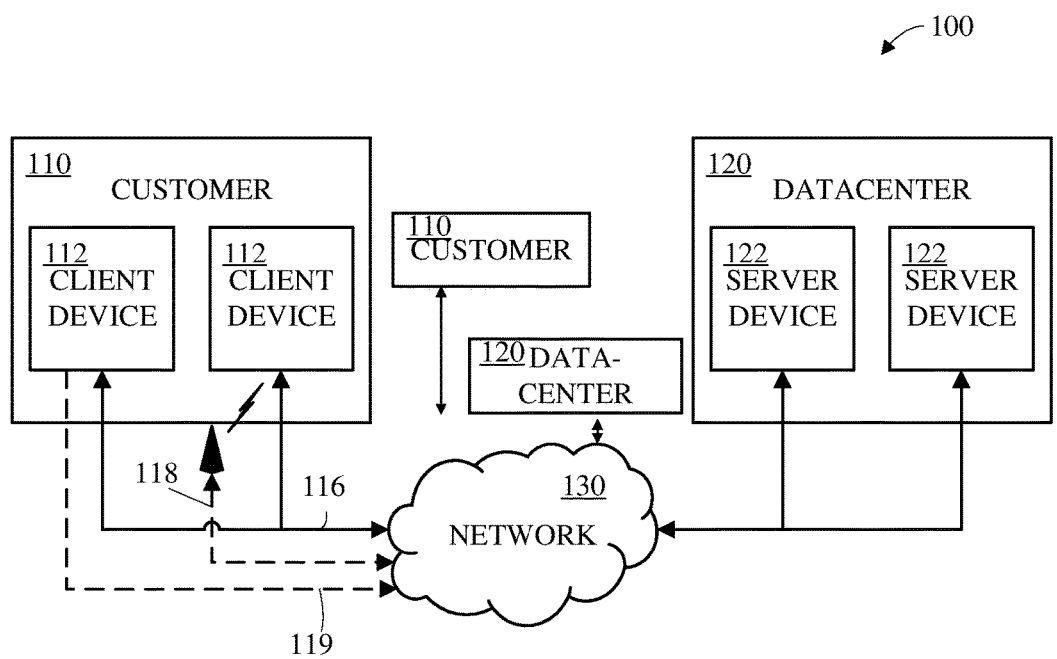
FIG. 1 is a block diagram of a distributed or cloud computing system.

An application instance or multiple application instances may be executed on one or more application and database nodes which may be hosted on one or more servers. An application instance may be accessible to client devices through a network. Interaction with the application instance may be performed through a web interface that is configured to authenticate access, display content, and facilitate inputs and outputs to and from the application instance. An application instance can, for example, include an instance of platform software executing on one or more application nodes which can provide a framework on which software applications and processes can be built. For example, the platform software can provide forms, lists, tables, workflow, integration, application development, database access, application programming interfaces, scripting interfaces, and other functionality to permit the execution and development of application programs. An application instance can include one or more database nodes, which can include database software configured to store records associated with the application instance.

The provisioning and execution of the nodes of application instance may require the expenditure of resources by associated application instance nodes which may reside on one or more server devices. For example, the resources required to provision and execute the application instance may include computing resources such as processing, memory, and storage resources. Application nodes and database nodes may consume resources even when in an idle state and not responding to requests. For example, an idle application node can consume memory and processor resources while waiting for a request or by periodically performing scheduled tasks.

Over time, the number of application instances or the amount of resources required to execute each application instance may increase, thereby increasing the overall amount of resources required to execute the application instances. Accordingly, the maintenance of effective access and execution of the application instances may require that additional resources are made available for operation of the application instance nodes.

The computing resources available for application instances, e.g., server devices, memory, storage, processing, network capacity, may be constrained. For example, only a certain number of server devices may be available, the processing or memory resources of server devices may be limited, the procurement of server devices, processing resources, or memory resources may be cost-prohibitive, or a combination thereof. In addition, monitoring and managing large numbers of application instances may be burdensome.

Thus, overprovisioning of application instances to resources within the distributed computing environment can be used to meet demand for application instances that, for example, exceed available or allocated resources. A system may be implemented to selectively execute application instances while hibernating idle application instances so as to constrain usage of resources to those which are available or allocated.

To more efficiently provide application instances and utilize available computing resources, a system may selectively hibernate application instances based on one or more criteria. A criterion may, for example, include the application instance: being idle for a predetermined period of time (e.g., eight hours); exceeding an evaluation time period (e.g., a number of days or weeks that ends on a particular date); detecting a malfunction in the application instance; prioritized access for certain clients; or a combination thereof.

A hibernated node can be replaced with a listener application that listens for network connections on a same network port as was used by the node before hibernation. Application instances in a state of hibernation may be restarted when a listener detects a qualifying request to a node the application instance. In response to such a request, the node of the application instance can be restarted on a condition that a predefined amount of resources are available to execute the node of the requested application instance. The hibernation, restarting, and observation of available resources on a given server device can be carried out by a software application executing on the server device, which can be referred to as a watcher.

Implementations of the foregoing systems and techniques can thus permit the provisioning of a greater number of application instances using the same resources through the hibernating of nodes (thus reclaiming idle or unused memory or processor resources) which may be restarted on demand. This can be useful, for example, in situations where large numbers of application instances might be provisioned (e.g., for a developer conference, for a training seminar, or the like) and may be used sparingly or for short periods of time (e.g., during a break-out session, training session, or the like).

To describe some implementations in greater detail, reference is first made to examples of hardware structures and interconnections usable in implementations of the present disclosure. FIG. 1 is a block diagram of a distributed or cloud computing system 100. Use of the phrase "cloud computing system" herein is a proxy for other forms of a distributed computing system, and this phrase is used simply for ease of reference. The cloud computing system 100 can have a number of customers, including customers 110. Each customer 110 may have clients, such as clients 112. Each of the clients 112 can be in the form of a computing system including multiple computing devices, or in the form of a single computing device, for example, a mobile phone, a tablet computer, a laptop computer, a notebook computer, a desktop computer, and the like. The customers 110 and clients 112 are examples only, and a cloud computing system may have a different number of customers or clients or may have a different configuration of customers or clients. For example, there may be hundreds or thousands of customers and each customer may have a number of clients.

The cloud computing system 100 can include a number of datacenters, including a datacenter 120. Each datacenter 120 may have servers, such as servers 122. Each datacenter 120 may represent a facility in a different geographic location where servers are located. Each of the servers 122 can be in the form of a computing system including multiple computing devices, or in the form of a single computing device, for example, a desktop computer, a server computer, a virtual machine and the like. The datacenter 120 and the servers 122 are examples only, and a cloud computing system may have a different number of datacenters and servers or may have a different configuration of datacenters and servers. For example, there may be tens of datacenters and each datacenter may have hundreds or a number of servers.

The clients 112 and servers 122 may be configured to connect to a network 130. The clients for a particular customer may connect to the network 130 via a common connection point 116 or different connection points, e.g., a wireless connection point 118 and a wired connection point 119. A combination of common or different connections points may be present, and a combination of wired and wireless connection points may be present as well. Network 130 can be, for example, the Internet. Network 130 can also be or include a local area network (LAN), wide area network (WAN), virtual private network (VPN), or other means of transferring data between the clients 112 and the servers 122. The network 130, datacenter 120 and/or blocks not shown may include network hardware such as routers, switches, load balancers and/or other network devices.

Other implementations of the cloud computing system 100 are also possible. For example, devices other than the clients and servers shown may be included in the system 100. In some implementations, one or more additional servers may operate as a cloud infrastructure control, from which servers and/or clients of the cloud infrastructure are monitored, controlled and/or configured. For example, some or all of the techniques described herein may operate on said cloud infrastructure control servers. Alternatively, or in addition, some or all of the techniques described herein may operate on servers such as the servers 122.

Figure 2:
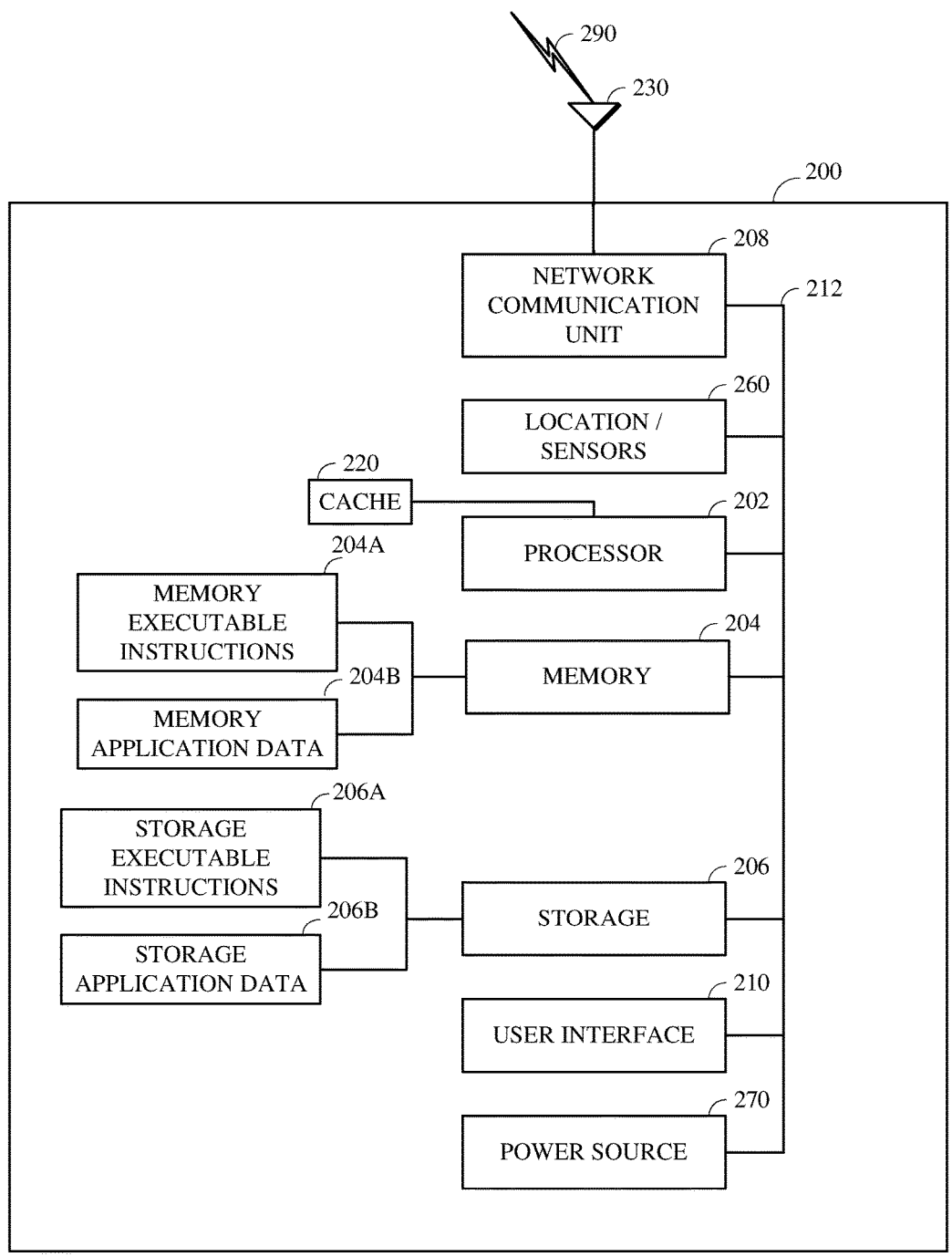
FIG. 2 is a block diagram of an example of an internal configuration of a computing device, such as a computing device of the computing system as shown in FIG. 1.

FIG. 2 is a block diagram of an example of an internal configuration of a computing device 200, such as a computing device (e.g., a client 112 or server device 122) of the computing system 100 as shown in FIG. 1. As previously described, the clients 112 or the servers 122 of FIG. 1 may take the form of a computing device 200 including multiple computing units, or in the form of a single computing unit, for example, a mobile phone, a tablet computer, a laptop computer, a notebook computer, a desktop computer, a server computer and the like.

The computing device 200 can include a number of components, as illustrated in FIG. 2. A processor 202 can be a central processing unit, such as a microprocessor, and can include single or multiple processors, each having single or multiple processing cores. Alternatively, the processor 202 can include another type of device, or multiple devices, capable of manipulating or processing information now-existing or hereafter developed. When multiple processing devices are present, they may be interconnected in various manners, including hardwired or networked, including wirelessly networked. Thus, the operations of the processor 202 can be distributed across multiple machines that can be coupled directly or across a local area or other network. The processor 202 can be a general purpose processor or a special purpose processor.

A memory 204 can be a suitable non-permanent storage device that is used as memory, for example, Random Access Memory (RAM). The memory 204 can include executable instructions and data for access by the processor 202. The memory 204 may comprise one or more DRAM modules such as DDR SDRAM. Alternatively, the memory 204 can include another type of device, or multiple devices, capable of storing data for processing by the processor 202 now-existing or hereafter developed. The processor 202 can access and manipulate data in the memory 204 via a bus 212. The processor 202 may utilize a cache 220 as a form of localized fast memory for operating on data and instructions.

A storage 206 can be in the form of read only memory (ROM), a disk drive, a solid state drive, flash memory, Phase-Change Memory (PCM), or another form of non-volatile memory designed to maintain data for some duration of time, and preferably in the event of a power loss. The storage 206 can include executable instructions 206A and application files/data 206B along with other data. The executable instructions 206A can include, for example, an operating system and one or more application programs for loading in whole or part into the memory 204 (with RAM-based executable instructions 204A and application files/data 204B) and to be executed by the processor 202. The executable instructions 206A may be organized into programmable modules or algorithms, functional programs, codes, and code segments designed to perform various functions described herein. The operating system can be, for example, a Microsoft Windows®, Mac OS X®, or Linux® operating system; an operating system for a small device, such as a smart phone or tablet device; or an operation system for a large device, such as a mainframe computer. The application program can include, for example, a web browser, web server and/or database server. The application files 206B can, for example, include user files, database catalogs and configuration information. The storage 206 may comprise one or multiple devices and may utilize one or more types of storage, such as solid state or magnetic.

The computing device 200 can also include one or more input/output devices, such as a network communication unit 208 and an interface 230 that may have a wired communication component or a wireless communications component 290, which can be coupled to the processor 202 via the bus 212. The network communication unit 208 can utilize one or more of a variety of standardized network protocols, such as Ethernet, TCP/IP, or the like to effect communications between devices. The interface 230 can comprise one or more transceiver(s) that utilize the Ethernet, power line communication (PLC), WiFi, infrared, GPRS/GSM, CDMA, or the like.

A user interface 210 can include a display, positional input device (such as a mouse, touchpad, touchscreen, or the like), keyboard, or other forms of user input and output devices. The user interface 210 can be coupled to the processor 202 via the bus 212. Other output devices that permit a user to program or otherwise use the client or server can be provided in addition to or as an alternative to the user interface 210. When the output device is or includes a display, the display can be implemented in various ways, including by a liquid crystal display (LCD), a cathode-ray tube (CRT), or a light emitting diode (LED) display (e.g., an OLED display).

Other implementations of the internal configuration or architecture of clients and servers are also possible. For example, servers may omit a display as the user interface 210. The memory 204 or the storage 206 can be distributed across multiple machines such as network-based memory or memory in multiple machines performing the operations of clients or servers. Although depicted here as a single bus, the bus 212 can be composed of multiple buses, that may be connected to each other through various bridges, controllers, and/or adapters. The computing device 200 may contain a number of sensors and detectors that monitor the computing device 200 itself or the environment around the computing device 200, such as sensors comprising a location identification unit 260, such as a GPS or other type of location device. The computing device 200 may also contain a power source 270, such as a battery, so that the unit can operate in a self-contained manner. These may communicate with the processor 202 via the bus 212.

Figure 3:
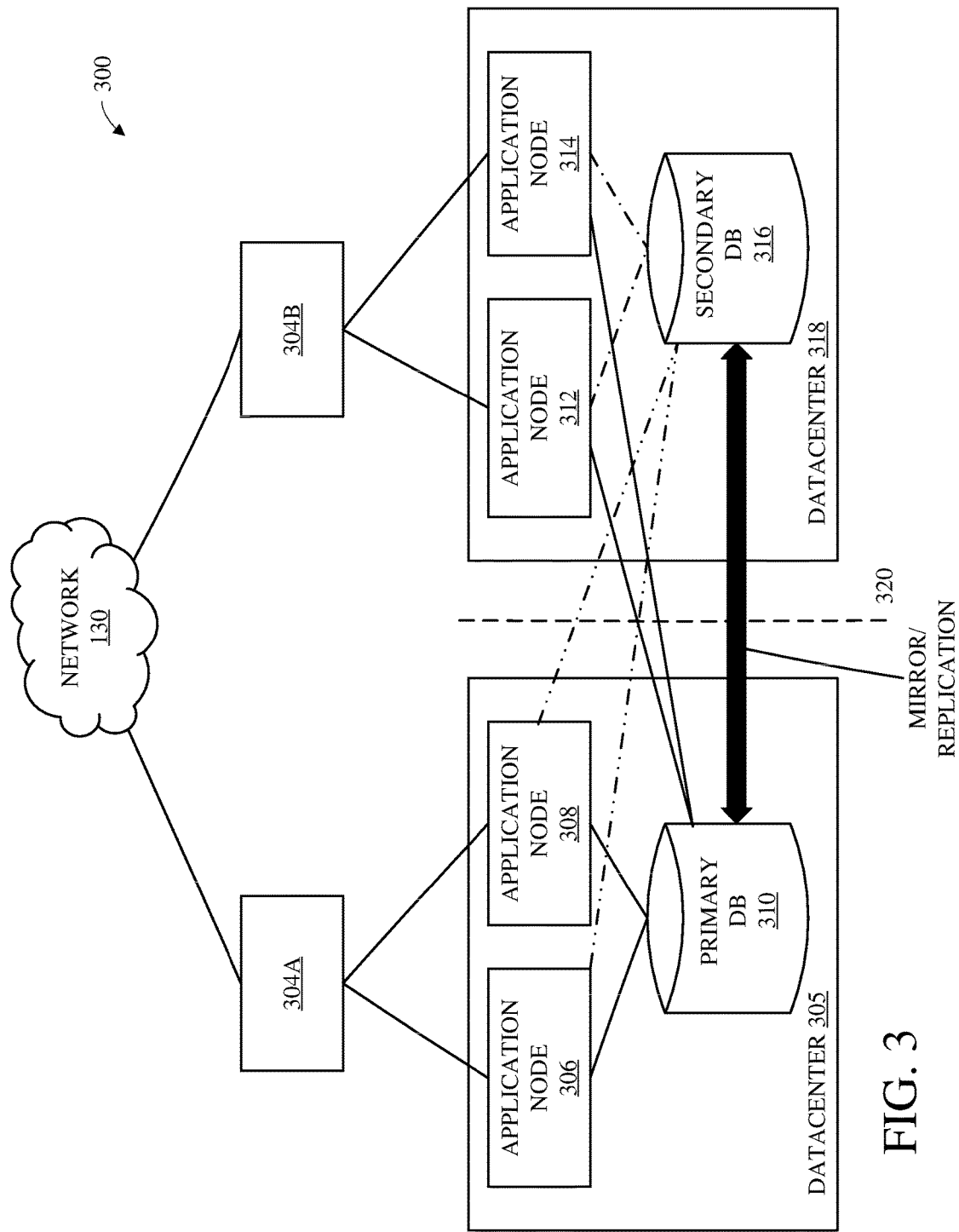
FIG. 3 is a block diagram of an example of a high availability processing system.

FIG. 3 is a block diagram of an example of a high availability processing system 300. The high availability processing system 300 can, for example, include an implementation of the datacenter 120 and the network 130 of FIG. 1. Broadly, the high availability processing system 300 includes load balancers 304A-304B and two datacenters 305, 318. The load balancers 304A-304B are coupled to a telecommunications network graphically depicted by network 130. The load balancers 304A-304B may also include reverse proxy load balancers.

The datacenter 305 includes a primary database 310, and the datacenter 318 includes a secondary database 316. The datacenters 305, 318 operate in such a manner that the secondary database 316 can provide an exact or substantially exact mirror of the primary database 310. A line 320 is used to graphically emphasize the logical boundary between the datacenters 305 and 318. Depending upon the intended application, the databases 310, 316 may be implemented using, for example, a relational database management system (RDBMS), an object database, an XML database, flat files, or the like.

Each datacenter 305, 318 can include two application nodes 306, 308, 312, 314, although a greater or lesser number can be used depending on the implementation. The application nodes can be implemented using processing threads, virtual machine instantiations, or other computing features of the datacenters that run programs on behalf of remotely sited clients, and exchange related data with such clients via a network 322 (e.g., the network 130 of FIG. 1). In connection with running these programs, occasions arise for the application nodes 306, 308, 312, 314 to store and retrieve data, with the databases 310 and 316 filling this role. In some implementations, each of the application nodes 306, 308, 312, 314 connects to a single primary database, such as the primary database 310, regardless of whether said database is located in the same datacenter as said application node. For example, the primary database 310 may be read/write and the secondary database 316 may be configured to be read-only such that it mirrors changes from the primary database 310. Requests to the system 300 may be routed to the application nodes 306, 308 in the datacenter 305 of the primary database 310 first, followed by the other datacenter 318. In a failover situation, the secondary database 316 may become read/write with the formerly primary database 310 switched to mirror the secondary database 316 (which becomes the primary database). In this situation, each application node 306, 308, 312, 314 can be reconfigured to point to the secondary database 316 (now the primary database) as shown by the dashed lines.

As mentioned above, each datacenter 305, 318 may have its own load balancer 304A-304B. Each load balancer 304A-304B may be configured to direct traffic to respective servers and processing nodes located within its datacenter. In regard to proxy services, in one example the load balancers 304A-304B are configured to provide a single Internet-delivered service to remote clients via the network 130, where this service is actually provided by a server farm composed of the computerized servers of the datacenters 305, 318. The load balancers 304A-304B also coordinate requests from remote clients to the datacenters 305, 318, simplifying client access by masking the internal configuration of the datacenters. The load balancers 304A-304B may serve these functions by directing clients to processing nodes as configured directly or via DNS. The load balancer 304A-304B can be configured for sticky sessions. With sticky sessions, requests from a client can be forwarded to the same application node 306, 308, 312, 314 for the duration of the client session.

In regard to load balancing, the load balancers 304A-304B can be configured to direct traffic to the secondary datacenter 318 in the event the primary datacenter 305 experiences one of many enumerated conditions predefined as failure. The load balancing functionality of the load balancers 304A-304B can be provided as separate components or as a single component.

Figure 4:
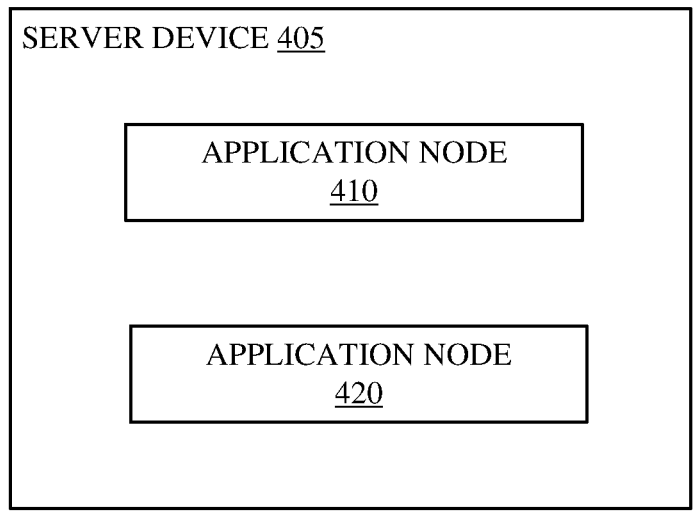
FIG. 4 is a block diagram of components including a server device and application nodes.

FIG. 4 is a block diagram of components including a server device 405 and application nodes 410 and 420. A plurality of application nodes (e.g., including the application nodes 410 and 420) can be provisioned on the server device 405. Alternatively, the plurality of application nodes can be provisioned on other computing devices, such as those shown in FIG. 1 or 2. The server device 405 hosts one or more application nodes, which include the application node 410 and the application node 420, although other amounts of application nodes may be hosted on one or more server devices. The application node 410 or the application node 420 may be used by one or more instances of an application which may, for example, include a computer software application.

The amount of application nodes provisioned to the server device 405 can be limited or controlled based on the resources (e.g., memory, processing, storage, or the like) provided by the server device 405, the resources required by the application nodes provisioned to the server device 405 (e.g., based on a sizing attribute of the application nodes 410, 420), the use of application instance node hibernation, or a combination thereof. For example, a sizing attribute can take into account whether an application node 410, 420 can be hibernated (thus, on average, requiring less resources). For example, an application instance that is expected to be active for only thirty percent of the time might have a sizing attribute of thirty percent or fifty percent of normal. For example, the server device 405 may be limited to forty application nodes that are not capable of hibernation and eighty application nodes that are capable of hibernation. The server device 405 may be limited to, for example, five application nodes that have a greater sizing attribute (e.g., that require more resources).

Figure 5:
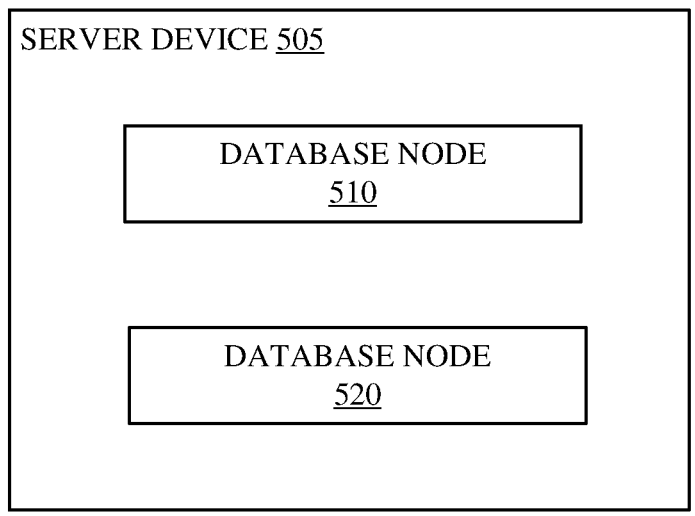
FIG. 5 is a block diagram of components including a server device and database nodes.

FIG. 5 is a block diagram of components including a server device 505 and database nodes 510 and 520. A plurality of database nodes (e.g., including the database nodes 510 and 520) can be provisioned on the server device 505. Alternatively, the plurality of database nodes can be provisioned on other computing devices such as those shown in FIG. 1 or 2. The server device 505 hosts one or more database nodes, which include the database node 510 and the database node 520, although other amount of database nodes may be hosted on one or more server devices. The database node 510 or the database node 520 may include a database application, which may, for example, include a computer software application such as an Oracle® database, a MySQL database, or a Microsoft® SQL database, although other types of databases and associated applications may be used. The server device 505, the database node 510, or the database node 520, may be associated with or in communication with the server device 405, the application node 410, the application node 420, or other types of computing devices associated with operation of the application instance. For example, the application node 410 can be configured to use the database node 510 for storage and the application node 420 can be configured to use the database node 520 for storage.

The amount of database nodes provisioned to the server device 505 can be limited or controlled based on the resources (e.g., memory, processing, storage, or the like) provided by server device 505, the resources required by database nodes provisioned to server device 505 (e.g., based on a sizing attribute of the database nodes 510, 520), the use of application instance node hibernation, or a combination thereof. For example, a sizing attribute can take into account whether a database node 510, 520 can be hibernated (thus, on average, requiring less resources). For example, the server device 505 may be limited to thirty database nodes that are not capable of hibernation and sixty database nodes that are capable of hibernation.

Figure 6:
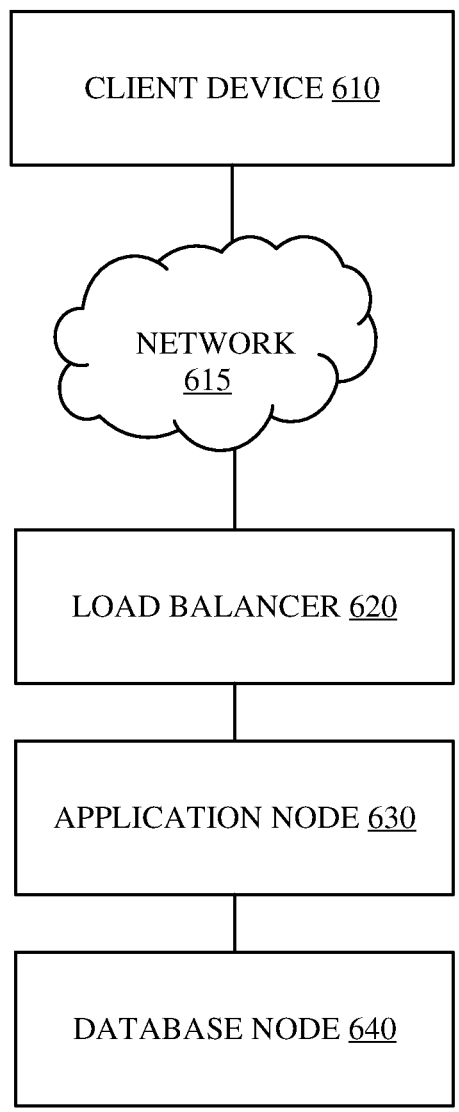
FIG. 6 is a block diagram of an example of a distributed computing environment including an application instance.

FIG. 6 is a block diagram of an example of a distributed computing environment including an application instance. A client device 610 can be configured to send and receive signals from a load balancer 620 through a network 615, which may be a type of network through which signals may be sent, such as the Internet, a local area network, mesh network, or a storage area network. The network 615 can be, for example, the network 130 as shown in FIG. 1. The load balancer 620 may be configured to direct traffic to an application node 630 (e.g., which may be the application node 410 or the application node 420 of FIG. 4). The traffic may be directed on the basis of a requested URL, or for the requested URL the traffic load may be balanced across the application nodes for that URL. An application instance can include, for example, the application node 630 and a database node 640 (e.g., which may be the database node 510 or the database node 520 of FIG. 5). An application instance can include other nodes, such as the application nodes or database nodes described and shown in FIG. 3. The load balancer 620 may distribute the traffic load, which may include requests for the application instances, across other application nodes such as the application node 630 or such as using techniques described in FIG. 3. The application node 630 can be configured to communicate with the database node 640 to store and retrieve data relating to requests received by the application node 630 or otherwise relating to its application instance.

The type of a requested instance may determine the number of nodes that are provisioned for that instance. For example, a demonstration instance, developer instance, or sales instance may be assigned to one application node and one database node. Alternatively, an instance may be provisioned with multiple application nodes, such as depending on the load, or one or more database nodes, such as described in FIG. 3. For example, a master database node may mirror its data to other database nodes and an application node may be configured to read data from the master database node for certain data and from other database nodes for other data.

Figure 7:
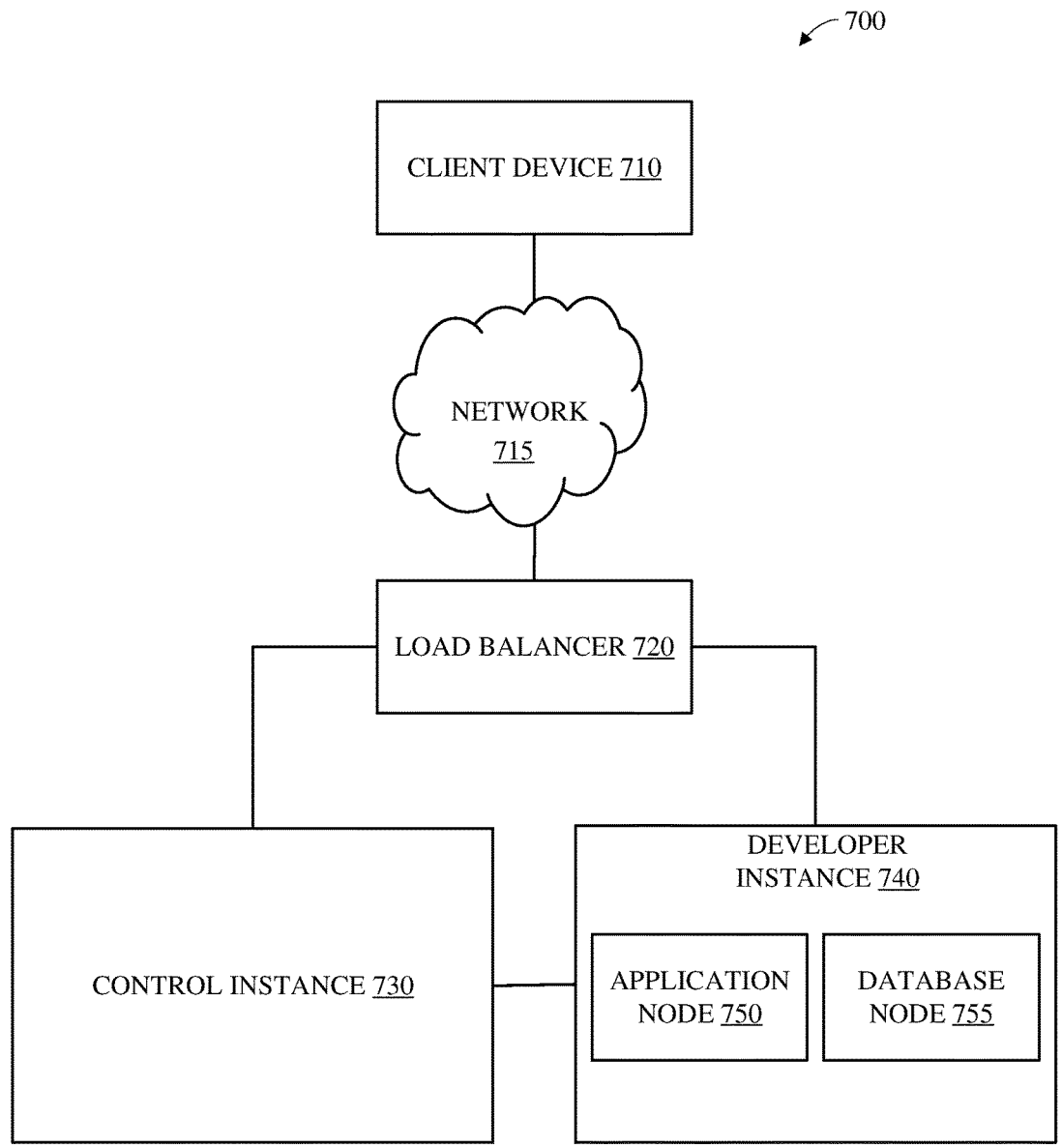
FIG. 7 is a block diagram of an example of a distributed computing environment including developer and control instances.

FIG. 7 is a block diagram of an example of a distributed computing environment system including developer and control instances. The system 700 may include a client device 710, which may be configured to access an instance, such as a developer instance 740, using a web browser and a network 715, although other forms of accessing the developer instance 740 may be used. As shown, the developer instance 740 is a type of application instance used for development activities, though in other implementations other instances can also be used, such as a sales instance, used for demonstration or sales purposes.

Access to the application instance may be controlled or administered by a load balancer 720, which may be used to distribute access to various instances. The load balancer 720 may be configured to direct requests such as requests for "dev01.service-now.com" to the developer instance 740, which may include or otherwise be implemented using an application node 750 and a database node 755. The developer instance 740, the application node 750, and the database node 755 can be implemented, for example, using the systems shown in FIG. 3 or 6. A control instance 730 may also be provided. The control instance 730 may be in the form of single or multiple instances and may be used to administrate or maintain application instances within a network environment such as the network 130, 605, or 715 or in a distributed or cloud computing environment, such as the cloud computing system 100 illustrated in FIG. 1.

The control instance 730 may store credentials for users (such as developers) that have been provisioned with developer instances, such as developer instance 740. The control instance 730 may retrieve authentication data such as a username or password which indicate that a corresponding user (such as an application developer) is associated with the developer instance 740 (although, in some implementations, the developer may be associated with other instances).

Figure 8:
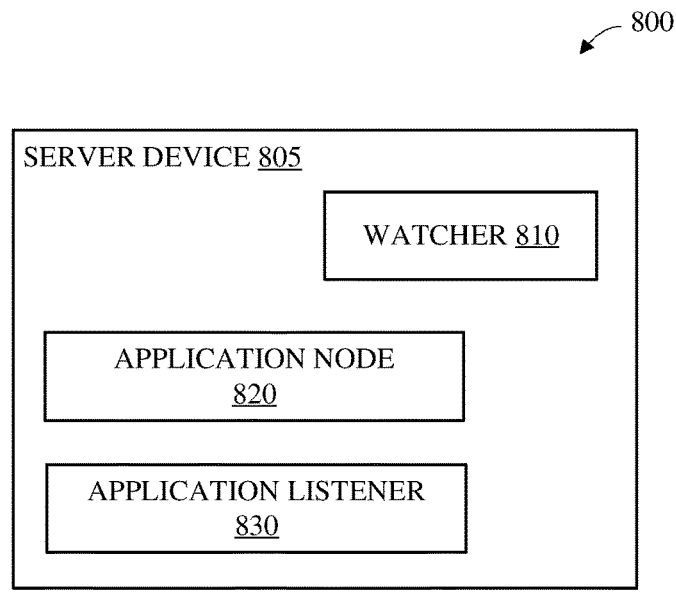
FIG. 8 is a block diagram of components in a system for selectively hibernating and restarting a node of an application instance.

FIG. 8 is a block diagram of components in a system 800 for selectively hibernating and restarting a node of an application instance. The system 800 may include a server device 805. The server device 805 may include a watcher 810 and an application listener 830, which may be associated with an application node 820.

When an instance is identified for hibernation, the application node 820 may be shut down and replaced with the application listener 830. The application listener 830 may be configured to detect or determine when an event occurs, and may be configured to perform an action, such as providing a notification, sending a signal, or executing an application, when the event is detected or determined. The application listener 830 may use a port that was previously used by the application node 820 and reserve it until the application node 820 is restarted. For example, the application listener 830 may listen on a port for a signal to wake up the application node 820 and restart the application node 820 when such a signal is received.

The watcher 810 may be configured to observe a process or operation, such as within a computing system, and may further be configured to perform an action, such as initiating or terminating the execution of a process or operation. The watcher 810 may be a software component executing on the server device 805 and may be used to manage processes, such as the hibernation and restarting of application nodes (e.g., the application node 820). The watcher 810 may observe usage of the available resources of the server device 805 to determine if the server device 805 has a predefined amount of resources to permit execution of the application node 820, such as to restart the application node 820. While the implementation shown in FIG. 8 has separate processes for the application listener 830 and the watcher 810, in some implementations, a watcher could independently start or stop application nodes or database nodes and observe usage. Alternatively, a single watcher may comprise all listeners for a server (e.g., the server device 805).

The watcher 810, the application node 820, or the application listener 830 may be included in the server device 805. Other numbers or combinations of watchers, application listeners, or application nodes may be included in other servers. For example, the watcher 810 and the application listener 830 may be implemented by the same software application.

Although FIG. 8 shows the server device 805 with the application node 820 and the application listener 830, in some implementations, the server device 805 can include database nodes and database listeners along with a watcher such as the watcher 810 configured similarly as described above with respect to FIG. 8.

FIGS. 3-8 depict implementations including servers, application instances (including development and control instances), application nodes, database nodes, application listeners, database listeners, load balancers, and the like. The implementations described in FIGS. 3-8 are intended to be examples and may be modified, interchanged, or combined depending on the implementation. For example, the developer instance 740 of FIG. 7 may be replaced with another type of application instance, including instances described with respect to the implementation shown in FIG. 3. For example, references herein to an application node can refer to one or more of the application nodes 306, 308, 312, 314, 630, 750, 820, or 910. For example, the application node 910 can be an implementation of one or more of the application nodes 306, 308, 312, 314, 630, 750, or 820.

Figure 9:
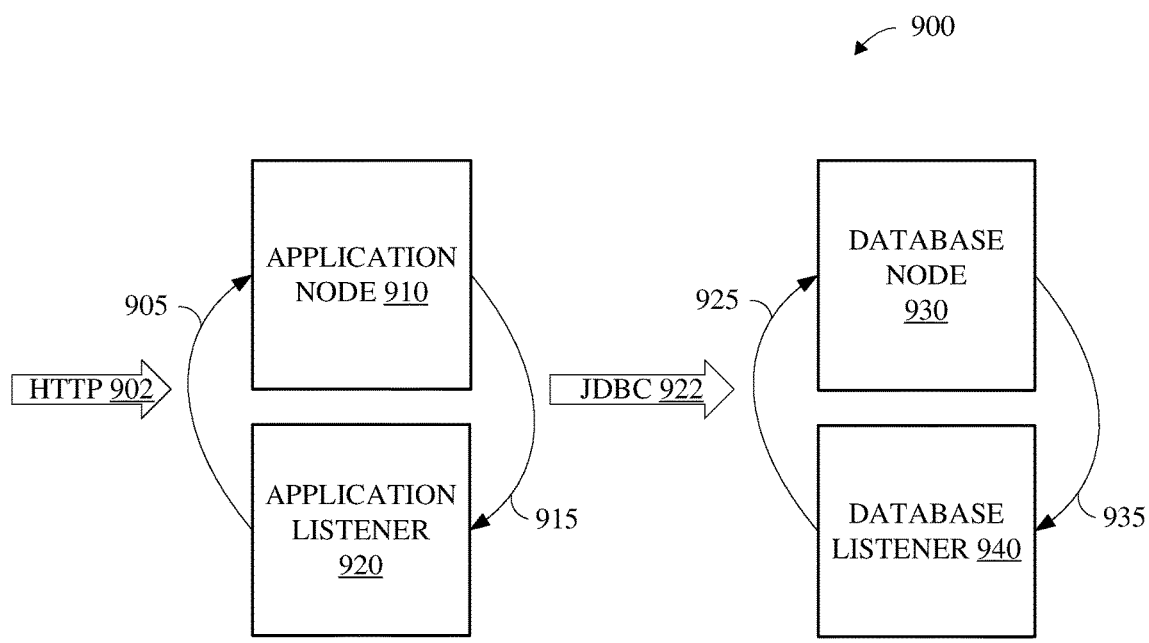
FIG. 9 is a state diagram of the operation of an example of a system for selectively hibernating and restarting a node of an application instance.

FIG. 9 is a state diagram of the operation of an example of a system 900 for selectively hibernating and restarting a node of an application instance. At state transition 905, an application node 910 may be hibernated and replaced with an application listener, such as an application listener 920. The state transition 905 can be triggered, for example, by a period where no client requests were received (e.g., via a Hypertext Transport Protocol (HTTP) request 902) by the application node 910 or for other reasons described herein. For example, the application node 910 may include a Java Virtual Machine or other type of computing application.

At state transition 915, the application node 910 can be restarted and the application listener 920 can be stopped. The state transition 915 can be triggered in response to the HTTP request 902 received by the application listener 920. The application listener 920 may restart operation of the application node 910 and suspend operation of the application listener 920. Alternatively, the application listener 920 may send a signal to a software application, such as a watcher (e.g., the watcher 810 of FIG. 8), to restart the application node 910 and/or suspend operation of the application listener 920.

At state transition 925, a database node 930 may be hibernated and replaced with a database listener, such as a database listener 940. The state transition 925 can be triggered, for example, by a period where no database requests were received (e.g., via a Java Database Connectivity (JDBC) request 922) by the database node 930 or for other reasons described herein. In some implementations, the application node 910 or the application listener 920 can initiate the JDBC request 922. In some implementations, the state transition 925 may be caused by the state transition 905.

At state transition 935, the database node 930 can be restarted and the database listener 940 can be stopped. The state transition 935 can be triggered in response to the JDBC request 922 received by the database listener 940. The database listener 940 may restart operation of the database node 930 and suspend operation of the database listener 940. Alternatively, the database listener 940 may send a signal to a software application, such as a watcher (e.g., the watcher 810 of FIG. 8), to restart the database node 930 and/or suspend operation of the database listener 940.

In some implementations, the application node 910 may be hibernated first, followed by the hibernation of the database node 930 after a second period of time, or if a second criterion is met. For example, the database node 930 might be hibernated only one hour after associated application nodes such as the application node 910 have been hibernated. The criterion used to hibernate the database node 930 can be decoupled from the criterion used for the application node 910. For example, the application node 910 might be hibernated after eight hours of inactivity whereas the database node 930 might be hibernated after one hour of inactivity. Such a configuration may be possible, such as in a case where the application node 910 makes requests to the database node 930 when idle, thus keeping the database node 930 from hibernating until at least, e.g., one hour after the application node 910 is hibernated.

The states, nodes, listeners, and protocols described with respect to FIG. 9 are examples and may be modified or changed depending on the implementation. For example, instead of HTTP or JDBC, other protocols may be used, such as SPDY or Open Database Connectivity (ODBC). In another example, the JDBC request 922 can be received from a component other than the application node 910 or the application listener 920.

Figure 10:
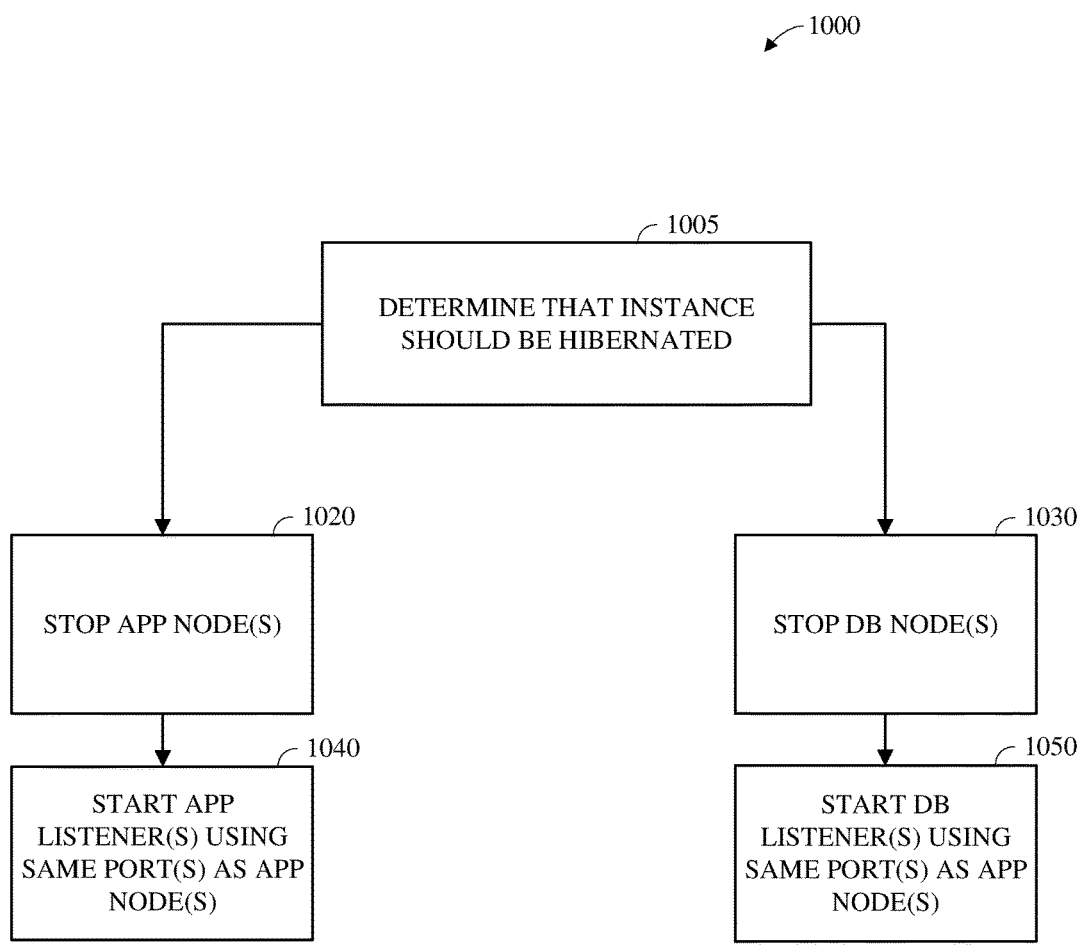
FIG. 10 is a flowchart of an example of a technique for hibernating an application instance in a system for selectively hibernating and restarting a node of an application instance.

FIG. 10 is a flowchart of an example of a technique 1000 for hibernating an application instance in a system for selectively hibernating and restarting a node of an application instance.

At step 1005, a determination may be made by an application listener, such as the application listener 830 of FIG. 8, that an application node, such as the application node 820 of FIG. 8, will be hibernated. The hibernation of an application node can include suspending execution of the application node so that the application node is not in an active state of operation. Alternatively, hibernating an application node can include stopping execution of one or more software applications that implements the application node.

The determination by the application listener to hibernate the application node may be made by determining that one or more criteria for hibernating the node are satisfied. For example, a criterion to hibernate an application node may be based on usage patterns of an associated application instance and such criterion may include not receiving any requests from a client device for greater than a threshold period of time (e.g., not receiving a request for eight or more hours). The application instance, when determining the period of time, may filter out certain types of requests meeting predefined criteria, such as automated requests which may include API requests. This filtering may be done prior to performing other criterion determinations. In this way, a non-user-generated request (such as automated requests that might be put into place by a user for the purpose of avoiding hibernation or by a system for observing health of the application instance) may be prevented from automatically causing an application instance to remain in a state of active operation. In some implementations, only interactive client sessions may be considered in determining the period of inactivity.

At step 1020, execution of the application instance using the application node is stopped, and, at step 1040, the application node is replaced with the execution of an application listener that can be configured to use the same network port as the previously running application node. For example, hibernating the application node can include suspending the execution of the application node and initializing the application listener. The application listener can be configured with functionality for processing requests to restart the application node. For example, the application listener may be configured to listen for future requests to restart the application node, such as using a network port that the application node used before it was suspended. In another example, the application listener can be configured to redirect requests to the application instance to the control instance and to cause application instance or node to restart after receiving a request to do so from the control instance. A load balancer (e.g., one of the load balancers 304A or 304B of FIG. 3, 620 of FIG. 6, or 720 of FIG. 7) can be configured with functionality for directing traffic to application nodes, such as based on requests to restart application nodes. For example, a load balancer that directs traffic to the application instance can be reconfigured to redirect traffic such as to a control instance, such as the control instance 730 of FIG. 7. For example, the load balancer can be reconfigured to direct traffic back to the application node once the application node is restarted.

At step 1030, execution of the database instance in a database node (e.g., the database node 930 of FIG. 9) is stopped, and, at step 1050, the database node is replaced with a database listener (e.g., the database listener 940 of FIG. 9) that can use the same port as the previously running application node. The database listener may, for example, be configured to listen for future requests to restart the database node.

Implementations of the technique 1000 other than those described above with respect to application instance hibernation are possible, including those that change, modify, add, delete, or combine steps. In some implementations, stopping the application nodes or stopping the database nodes may be performed serially or in parallel. In some implementations, only certain types of application node instances or database node instances are candidates for hibernation. In some implementations, a developer size type may be used so that only that particular size type of instance is hibernated. The capacity of servers hosting such instances may then be overprovisioned by a set factor or based on historical usage of resources by like application instances. For example, a developer size type may be set to require half the resources of a typical instance thus permitting 100% overprovisioning.

In some implementations, the determination that an instance should be hibernated can be separate for application nodes and database nodes of an application instance. For example, the step 1005 may be configured to detect that an application node should be hibernated (e.g., after a first condition for inactivity is reached), and, in response, step 1020 and step 1040 may be performed. This process may be performed more than once if there is more than one application node associated with the application instance. Once all application nodes for an instance are hibernated, requests to the database nodes are stopped, and an added step may be configured to detect that a database node should be hibernated (e.g., after a second condition for inactivity is reached), and, in response, step 1030 and step 1050 may be performed. This process may be performed more than once if there is more than one database node.

Figure 11:
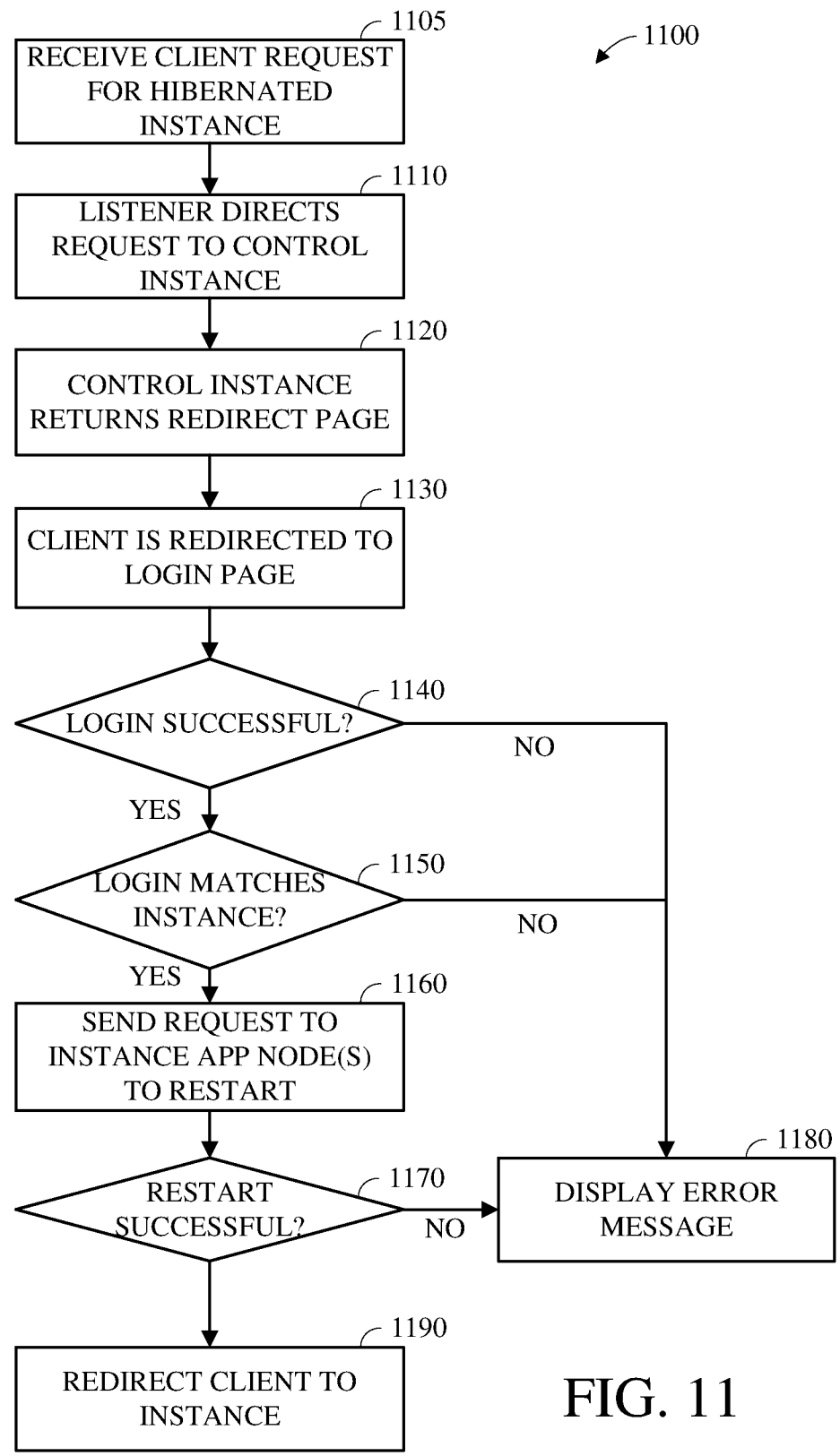
FIG. 11 is a flowchart of an example of a technique for receiving a request causing the restart of an application instance in a system for selectively hibernating and restarting a node of an application instance.

FIG. 11 is a flowchart of an example of a technique 1100 for receiving a request causing the restart of an application instance in a system for selectively hibernating and restarting a node of an application instance. At step 1105, an application listener, which may be an application listener such as the application listener 830 of FIG. 8, receives a request sent from a client, although the application listener may also be configured to receive other types of requests. The request can be received from the client through a communication network and may include a request for a hibernated application instance, which may include an application node hosted on a server device. Alternatively, the application listener may provide the client with an indication that the requested application instance is hibernated. The indication that the application instance is hibernated may be provided in a web page, although other ways of providing the indication may be used.

At step 1110, the application listener directs the received request to a control instance which may be configured to manage the application listener or other listeners. For example, the control instance may maintain a configuration management database (CMDB) including one or more records that associate an IP address and port to an application node or a database node. Further, the control instance may use the CMDB to know which nodes or components are on which servers, and which application nodes or database nodes belong to which application instances.

At step 1120, the control instance may provide a redirect page to indicate that the requested application instance is in hibernation and that redirection to an authentication page will occur before the instance will be restarted, although other types of indications or messages may be provided. Alternatively, the redirect page may be provided by a different component, such as the application listener. In yet another alternative, no redirect page is provided before the login page and the login page may inform a user that the application instance is hibernated.

At step 1130, the client is redirected to an authentication page where authentication data may be received. For example, the authentication data may include username, password, biometric, or other types of authentication data, or combinations thereof. Additionally, the control instance may keep track of the original instance requested such as via an HTTP header indicating the requested domain and/or URL. The authentication page may be displayed in a format such as a web page.

If at step 1140 the control instance determines that the received authentication data is correct, and at step 1150 the control instance determines that the authenticated user is associated with the requested instance, domain or URL, then, at step 1160, a request is sent to the application instance to restart the application node instance. For example, the request can be sent to an application node, a database node, or a combination thereof.

If at step 1140 the control instance determines that the received authentication data is not correct, or at step 1150, the control instance determines that the user is not associated with the requested instance or domain, then error handling is performed at step 1180 such that an error message may be displayed. For example, the error message may indicate that the provided authentication data is incorrect or may redirect the client back to the authentication page at step 1130.

At step 1170, the control instance determines whether the restart was successful. For example, the control instance can asynchronously poll the application instance to determine if a response is received (e.g., from a restarted application node). If no response is received (or, alternatively, if a response is received from a listener), the control instance can determine that restart was unsuccessful. In another example, the listener or node can signal the control instance directly that the restart was successful or unsuccessful. If the restart is determined not to be successful, then control passes to step 1180 where error handling may be performed such that an error message can be displayed. For example, a message can be displayed to the user that there is high volume and to try again later. Different types of error messages may be provided based on the type of error that has occurred, so that unsuccessful authentication, failure to associate an instance, or failure to restart would result in corresponding error messages.

If the application instance node is successfully restarted at step 1170, then the client is redirected to the application instance. For example, a successful restart can be indicated if an application node indicates that it was successfully restarted, a database node indicates that it was successfully restarted, or a combination thereof.

Figure 12:
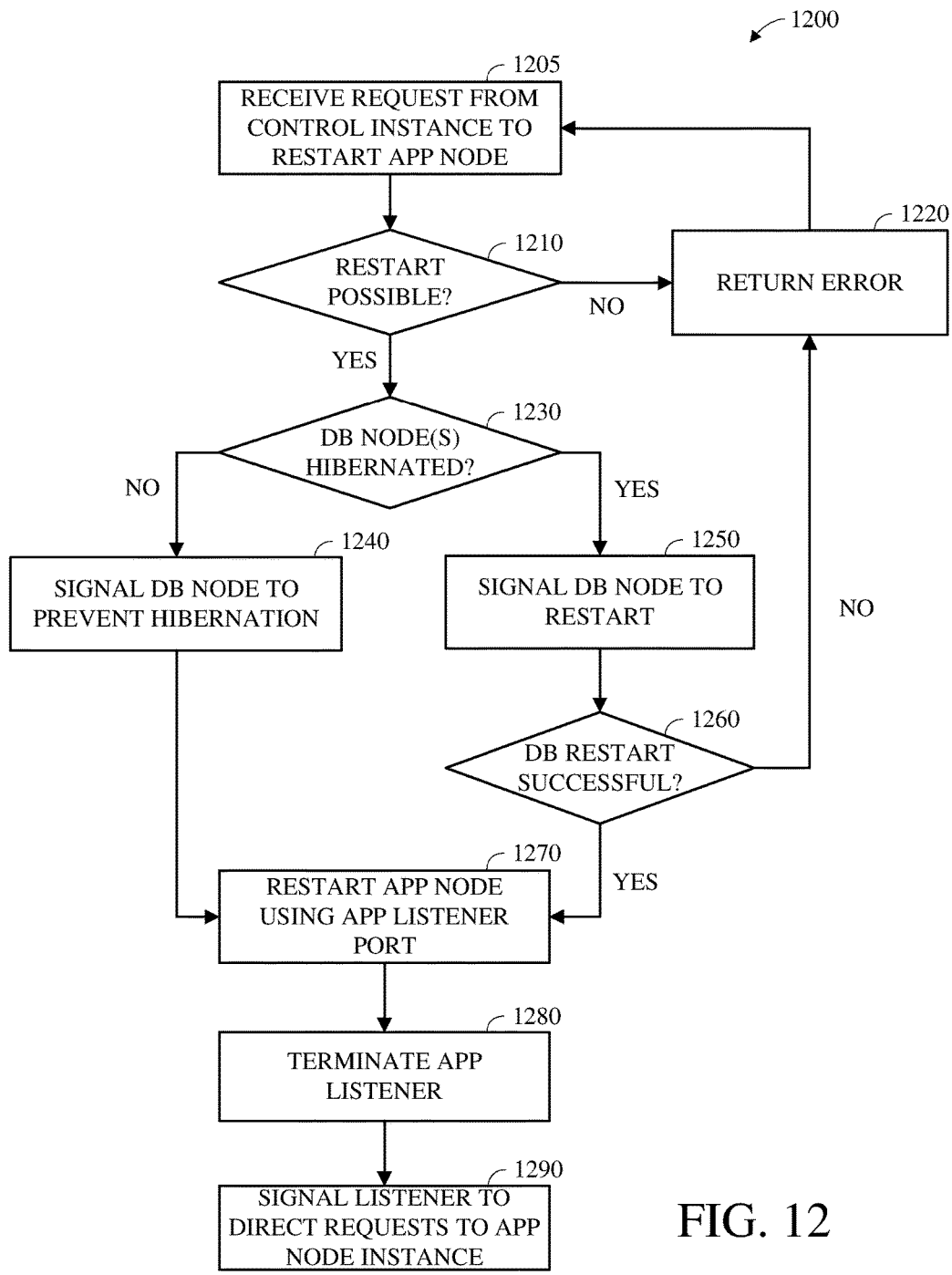
FIG. 12 is a flowchart of an example of a technique for restarting nodes of an application instance in a system for selectively hibernating and restarting a node of an application instance.

FIG. 12 is a flowchart of an example of a technique 1200 for restarting nodes of an application instance in a system for selectively hibernating and restarting a node of an application instance.

At step 1205, a request to restart an application instance may be received by an application listener, which may be an application listener such as the application listener 830 of FIG. 8, such as from a control instance. The application listener can be configured to only permit restart requests from a particular control instance, from any control instance, from a certain set of network devices that is formatted in a particular fashion, that are authenticated, or a combination thereof.

Next, at step 1210, the application listener may determine whether a restart of the instance is possible based on resource data from a watcher which may be a watcher such as the watcher 810 of FIG. 8. The application listener may send a request to a watcher executed on a server device, which may be the server device 805 of FIG. 8, and which may be the server device on which the application listener is located. In response to the request from the application listener, the watcher may examine historical records of the server device resource usage; perform a scan of available resources in the server, which may include a scan of CPU, memory, and storage resources, although other types of resources may be scanned by the watcher; or a combination thereof. For example, the watcher may determine the amount of resources that are required to execute the instance on the server.

If, based on the resource data, a predefined amount of resources are not available to permit execution of a node (e.g., to restart the application instance), the application listener, the watcher, or another component can determine that restart is not possible. In such a case, control can pass to step 1220, where an indication that resources are not available may be provided to the client requesting the application instance, although other types of indications or error messages may be provided to the client.

If, based on the resource data, a predefined amount of resources are available to restart the application instance, the application listener, watcher, or other component can determine that a restart is possible. In such a case, control can pass to step 1230, where a determination of whether the database node(s) associated with the application node are hibernated is made by the application listener, watcher or other component. For example, a request can be made to the database node(s) to determine whether the database node(s) are hibernated.

If, at step 1230, the application listener, watcher, or other component determines that the database nodes are not hibernated, then, at step 1240, a signal is sent to the database node to prevent hibernation, and the next step is step 1270, discussed below, in which the application node is restarted using an application listener port.

If, at step 1230, the application listener, watcher, or other component determines that the associated database nodes are hibernated, then control passes to step 1250, where a signal is sent to the database listener to restart the database node. When the database listener receives the signal, it can perform steps that cause the database node to be restarted and the database listener to be stopped, for example, as described above with respect to FIG. 9.

Alternatively, a signal may be sent to the database node to prevent hibernation during the restart process, such as in a case where the database node may be close to achieving a condition that would trigger hibernation. In such a case, steps 1230, 1240, and 1250 can be combined into one request to the database node/database listener.

Next, at step 1260, the watcher determines whether the database restart was successful. For example, the determination of whether the database restart was successful may be made by sending a signal to the database node/listener or otherwise polling the database node/listener to determine that it was successfully restarted. If the database restart was not successful, control passes to step 1220, where, as described above, an indication such as an error message that resources are not available may be provided.

If, at step 1260, the watcher determines that the database restart was successful, then control passes to step 1270.

At step 1270, the database listener may attempt to restart the database node and, if successful, may stop execution of the database listener. For example, the restarted database node may use the same port as its associated database listener. If the database node restart is successful, the application node may be restarted using the same port as the application node listener.

At step 1280, the watcher terminates the application listener. At step 1290, after terminating the application listener, a signal listener is executed in order to direct requests to the application node instance.

Implementations of the technique 1200 other than those described above with respect are possible, including those that change, modify, add, delete, or combine steps. In some implementations, hibernation and restart statistics can be captured, such as on a per server device basis, in order to permit the generation of models to determine the appropriate level of over-provisioning possible for certain types of application instances. For example, a watcher can be configured to collect information, such as the number or percentage of suspended services, average or aggregate idle times, aggregate resource usage, load profiles (e.g., indications of the usage percentage of resources available on the server device over certain time intervals) and other related usage information. Such information can be compiled at a central location such as the control instance and can be used to adjust the sizing or over-provisioning of instances. In some implementations, the observed data can be associated with a type or other attribute of application instances, for example, a type of database software, a type of instance (e.g., developer, conference, training, sales, etc.), or other attribute to enable a more accurate determination of the appropriate over-provisioning amount or to permit the distribution of different types of application instances to different servers to maximize resource usage. For example, historical data may reveal that instances with a certain attribute are active only during the day in the United States, and instances with a certain other attribute are active only during the day in India, so such instances can be provisioned to a same server device to maximize resource usage over a twenty four-hour period.

In some implementations, a listener or watcher is configured to respond properly to observation or maintenance requests made to a hibernated node. For example, an observation service may be configured to check that a node is functioning properly. If the observation service is unaware of hibernation, the listener or watcher can respond as the observation service expects, so that no alerts indicating that the hibernated node is not functioning properly are generated. In such an implementation where the observation service is aware of hibernation, the listener or watcher may respond with an indication that the node is hibernated. In some implementations, a backup service operating on a server device is configured to not backup nodes that are hibernated, such as when a backup operation requires interaction with the node (e.g., as opposed to a disk-copy backup).

In some implementations, if a restart request is received for an application instance where a node is provisioned on a server device that does not have the predefined amount of resources to restart the node, an instance move request can be generated manually or automatically. For example, the instance move can move a node from a server device that does not have the predefined amount of resources to a different server device with the predefined amount of resources to permit restarting execution of the node. In some implementations, the instance move can be triggered upon a condition, for example, after a first request where an instance cannot be restarted, after a later request, after an instance cannot be restarted for a period of time (e.g., four hours), or a combination thereof.

Figure 13:
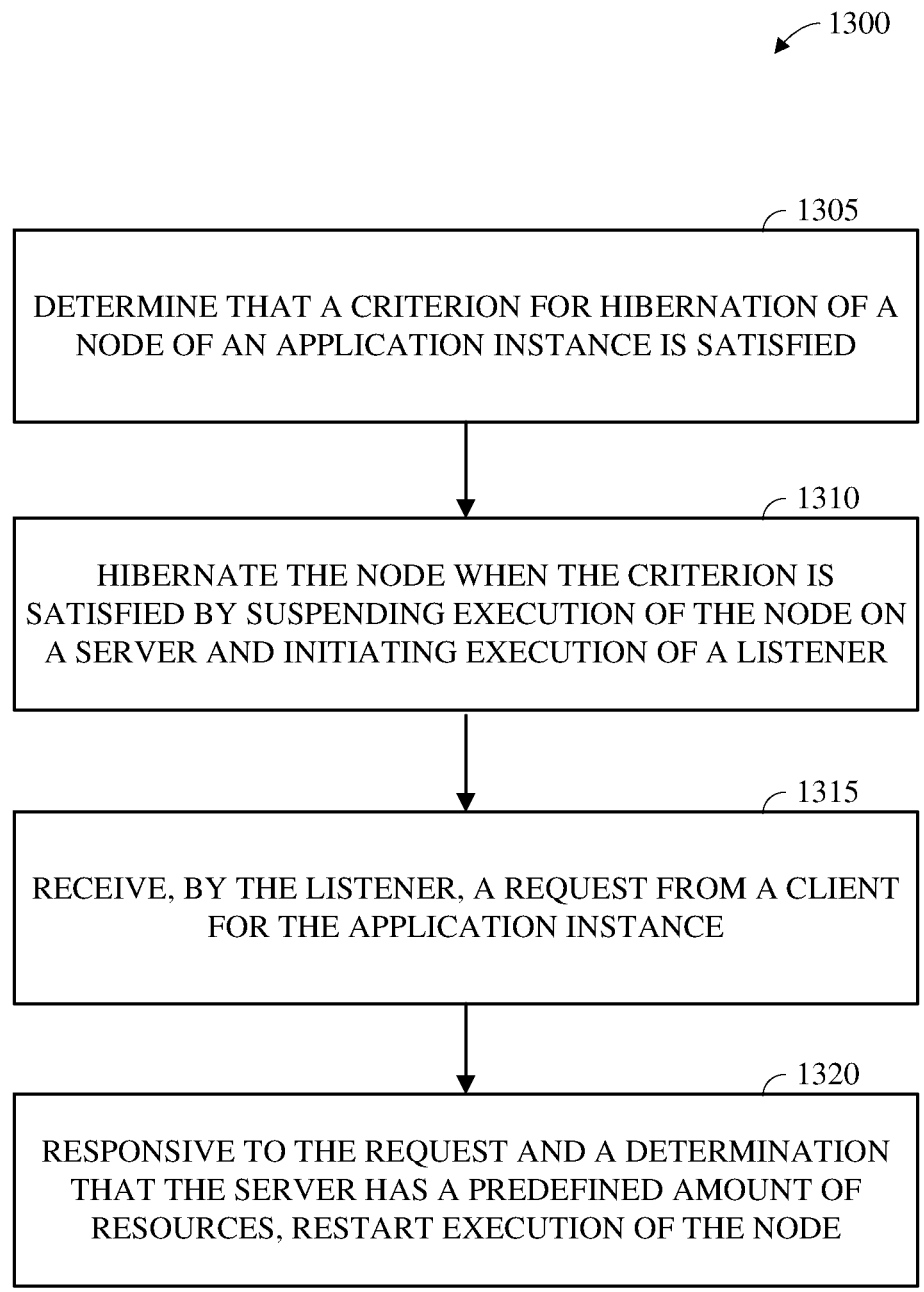
FIG. 13 is a flowchart of an example of a technique for selectively hibernating and restarting a node of an application instance.

FIG. 13 is a flowchart of an example of a technique 1300 for selectively hibernating and restarting a node of an application instance. At step 1305, a determination is made that a criterion for hibernating a node of an application instance is satisfied. The determination that a criterion for hibernating the node can be made using the technique 1000 of FIG. 10, for example, by the determination at step 1005 that the node should be hibernated. For example, a listener (e.g., an application listener or database listener) can be used to determine that one or more criteria for hibernating the node are satisfied, such as based on usage patterns of the application instance, a number of requests for the application instance received over a period of time, or the like.

At 1310, the node is hibernated when the criterion is satisfied. Hibernating the node can include suspending execution of the node on a server and initiating execution of a listener. The node can be hibernated using the technique 1000, for example, by the stopping steps 1020, 1030 and the starting listener steps 1040, 1050. Before the execution of the node is suspended, the node executes on a server (e.g., a server device included in a distributed computing environment) and uses a network port of the server. The listener that is initiated after the execution of the node is suspended can use the same network port that the node used before the execution thereof was suspended.

At 1315, the listener receives a request from a client for the application instance. For example, after the node is hibernated, such as using the technique 1000, the request can be received using the technique 1100 of FIG. 11 (e.g., such that the technique 1100 can be performed after the technique 1000). The request for the hibernated application instance can be received from the client and directed to a control instance, such as at the steps 1105 and 1110. The control instance may, for example, maintain a CMDB including a record indicating that the node executes on the server. The control instance can authenticate the client that sent the request, such as to prevent automated or unauthorized requests to restart the hibernated node. For example, the authentication can be performed at the steps 1130-1150, such as based on a username, a password, biometric, or other data.

At 1320, execution of the node is restarted. The execution of the node can be restarted responsive to the request and a determination that the server has a predefined amount of resources to permit execution of the node. After receiving the request, the determination as to whether the server has a predefined amount of resources to permit execution of the node can be made using a watcher that observes the use of resources of the server for the determination. The execution of the node can, for example, be restarted using the technique 1100, such as by sending a request to the application instance to restart the application instance at step 1160. For example, the request can be sent to an application node, a database node, or a combination thereof. The request can be processed using the technique 1200 of FIG. 12, such as at the server at which execution of the node will be restarted. The server can process requests to restart executions of one or more application nodes or database nodes used to implement the application instance. For example, the execution of an application node associated with the application instance may be restarted before execution of a database node associated with the application instance.

An implementation includes means for determining that a criterion for hibernating a node of an application instance is satisfied; means for hibernating the node when the criterion is satisfied by suspending execution of the node on a server and initiating execution of a listener using a network port that the node used before the suspending; means for receiving, by the listener, a request from a client for the application instance; and means for, responsive to the request and determining that the server has a predefined amount of resources to permit execution of the node, restarting execution of the node.

An implementation includes means for observing an operation of a node executed by a processor on a first server, wherein the node is a node of an application instance in a distributed computing environment; means for detecting a condition of the node based on the observing, the condition satisfying a criterion for hibernating the node; means for hibernating the node by suspending execution of the node on the first server and initiating execution of a listener on the first server using a network port the used by the node to communicate with a computer network via a network interface of the first server before the suspending; means for receiving, by the listener, a request from a client for the application instance using the network interface of the first server and a network interface of the client; and means for restarting execution of the node in response to the request, a determination that the first server has a predefined amount of available resources to permit execution of the node, and an authentication of the client using a control server connected to the first server using the network interface of the first server and a network interface of a control server, wherein the control server includes a configuration management database including one or more records that associate an address and the network port with the node.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and RAM blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this disclosure, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this disclosure and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical".

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if respective references were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system for selectively hibernating and restarting execution of a node of an application instance on a first server of a plurality of servers in a distributed computing environment, the system comprising:
   a memory; and
   a processor,
   wherein the memory includes instructions executable by the processor to:
      receive server usage data from a watcher for each of the plurality of servers, wherein the server usage data is received on a per-server basis for the plurality of servers is utilized to generate performance models;
      determine an appropriate level of provisioning available for a plurality of different types of application instances to be executed on the plurality of servers based on the server usage data, the performance models, or a combination thereof;
      determine that a criterion for hibernation of the node is satisfied based on the server usage data for the first server;
      hibernate the node when the criterion is satisfied, the instructions to hibernate including instructions to suspend execution of the node on the first server and initiate execution of a listener using a network port to reserve the node used before the suspension;
      receive, by the listener, a request from a client for the application instance;
      provide a redirect page indicating that the application instance is in hibernation;
      receive an input from the client at the redirect page indicating that the client is authorized to access the application instance;
      request the hibernated node be restarted based on the client being authorized to access the application instance;
      responsive to the request and a determination that the first server has a predefined amount of resources to permit execution of the node, restart execution of the node, wherein the determination that the first server has the predefined amount of resources is based on the server usage data;
      redirect the client to the application instance upon the node restarting; and
      responsive to a determination that the first server does not have the predefined amount of resources based on the server usage data to permit execution of the node, initiate an instance move of the application instance to a different server of the plurality of servers.

2. The system of claim 1, wherein the instructions to restart execution of the node include instructions to use the listener to direct the request to a control instance configured to manage the listener.

3. The system of claim 2, wherein the control instance maintains a configuration management database including one or more records that associate an address and the network port with the node.

4. The system of claim 2, wherein the instructions include instructions to:
   responsive to using the control instance to determine that the restart of execution of the node was unsuccessful, perform error handling.

5. The system of claim 1, wherein the instructions to, responsive to the request and the determination that the first server has the predefined amount of resources to permit execution of the node, restart execution of the node include instructions to:
   determine that the first server has the predefined amount of resources to permit execution of the node; and
   execute the node responsive to the determination that the first server has the predefined amount of resources.

6. The system of claim 1, wherein the watcher executed on the first server manages the hibernation and the restart of the node.

7. The system of claim 6, wherein the watcher observes usage of resources of the first server to determine that the first server has the predefined amount of resources to permit execution of the node.

8. The system of claim 6, wherein the listener sends a signal to the watcher and the watcher restarts execution of the node based on the signal.

9. The system of claim 1, wherein the instructions include instructions to:
   responsive to receipt of the request, authenticate the client.

10. The system of claim 1, wherein the node is an application node and the criterion is a first criterion, wherein the instructions include instructions to:
   hibernate a database node of the application instance when a second criterion for hibernation of the database node is satisfied, wherein the first criterion used to hibernate the application node is decoupled from the second criterion used to hibernate the database node.

11. The system of claim 1, further comprising a load balancer, wherein the load balancer directs traffic to a control instance that restarts execution of the node when the node is in hibernation, wherein the load balancer directs traffic to the application instance when the node is not in hibernation.

12. A method for selectively hibernating and restarting execution of a node of an application instance on a first server of a plurality of servers in a distributed computing environment, the method comprising:
    receiving server usage data from a watcher for each of the plurality of servers, wherein the server usage data is received on a per-server basis for the plurality of servers and is utilized to generate performance models;
    determining an appropriate level of provisioning available for a plurality of different types of application instances to be executed on the plurality of servers based on the server usage data, the performance models, or a combination thereof;
    determining that a criterion for hibernating the node is satisfied based on the server usage data for the first server;
    hibernating the node when the criterion is satisfied, wherein hibernating the node comprises suspending execution of the node on the first server and initiating execution of a listener using a network port to reserve the node used before the suspending;
    receiving, by the listener, a request from a client for the application instance;
    providing a redirect page indicating that the application instance is in hibernation;
    receiving input from the client at the redirect page indicating that the client is authorized to access the application instance;
    requesting the hibernated node to be restarted based on the client being authorized to access the application instance;
    responsive to the request and determining that the first server has a predefined amount of resources to permit execution of the node, restarting execution of the node, wherein the determination that the first server has a predefined amount of resources is based on the server usage data; and
    redirecting the client to the application instance upon the node restarting; and
    responsive to a determination that the first server does not have the predefined amount of resources based on the server usage data to permit execution of the node, initiating an instance move of the application instance to a different server of the plurality of servers.

13. The method of claim 12, wherein restarting execution of the node comprises:
    using the listener to direct the request to a control instance configured to manage the listener, wherein the control instance maintains a configuration management database including one or more records that associate an address and the network port with the node.

14. The method of claim 12, wherein, responsive to the request and the determining that the first server has the predefined amount of resources to permit execution of the node, restarting execution of the node comprises:
    determining that the first server has the predefined amount of resources to permit execution of the node; and
    executing the node responsive to the determining that the first server has the predefined amount of resources.

15. The method of claim 12, wherein the watcher executing on the first server manages the hibernating and the restarting of the node.

16. The method of claim 15, wherein the watcher observes usage of resources of the first server to determine that the first server has the predefined amount of resources to permit execution of the node.

17. The method of claim 15, wherein the listener sends a signal to the watcher and the watcher restarts execution of the node based on the signal.

18. The method of claim 12, wherein the node is an application node and the criterion is a first criterion, wherein the method further comprises:
    hibernating a database node of the application instance when a second criterion for hibernating the database node is satisfied, wherein the first criterion used to hibernate the application node is decoupled from the second criterion used to hibernate the database node.

19. A non-transitory computer-readable storage medium comprising processor-executable routines that, when executed by a processor, facilitate a performance of operations comprising:
    observing an operation of a node executed by the processor on a first server of a plurality of servers, wherein the node is a node of an application instance in a distributed computing environment;
    receiving server usage data from a watcher for each of the plurality of servers, wherein the server usage data is received on a per-server basis for the plurality of servers and is utilized to generate performance models;
    determining an appropriate level of provisioning available for a plurality of different types of application instances to be executed on the plurality of servers based on the server usage data, the performance models, or a combination thereof;
    determining that a criterion for hibernation of the node is satisfied based on the observing, based on the server usage data for the first server, or a combination thereof;
    hibernating the node by suspending execution of the node on the first server and initiating execution of a listener on the first server using a network port to reserve the node to communicate with a computer network via a network interface of the first server before the suspending;
    receiving, by the listener, a request from a client for the application instance using the network interface of the first server and a network interface of the client;
    providing a redirect page indicating that the application instance is in hibernation;
    receiving input from the client at the redirect page indicating that the client is authorized to access the application instance;
    requesting the hibernated node to be restarted based on the client being authorized to access the application instance;
    restarting execution of the node in response to the request, a determination that the first server has a predefined amount of available resources based on the server usage data to permit execution of the node, and wherein the authorization comprises an authentication of the client using a control server connected to the first server using the network interface of the first server and a network interface of the control server, wherein the control server includes a configuration management database including one or more records that associate an address and the network port with the node;

redirecting the client to the application instance upon the node restarting; and responsive to a determination that the first server does not have the predefined amount of resources based on the server usage data to permit execution of the node, initiating an instance move of the application instance to a different server of the plurality of servers.

* * * * *